(12) United States Patent
Katrak et al.

(10) Patent No.: US 8,044,787 B2
(45) Date of Patent: Oct. 25, 2011

(54) DISCRETE SENSOR INPUTS

(75) Inventors: Kerfegar Khurshed Katrak, Kalamazoo, MI (US); Todd William Fritz, Kalamazoo, MI (US); Richard Earl Zuppann, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 404 days.

(21) Appl. No.: 12/247,016

(22) Filed: Oct. 7, 2008

(65) Prior Publication Data

US 2010/0085178 A1  Apr. 8, 2010

(51) Int. Cl.
*B60Q 1/00* (2006.01)
*H03M 13/00* (2006.01)
*G08B 21/00* (2006.01)

(52) U.S. Cl. ........ 340/456; 477/906; 341/94; 340/686.1

(58) Field of Classification Search ............... 340/438, 340/439, 453, 454, 456, 686.1, 691.7, 691.8, 340/3.43, 3.44; 341/97, 106, 94; 477/906; 714/48–52, 57

See application file for complete search history.

(56) References Cited

U.S. PATENT DOCUMENTS

| | | | | |
|---|---|---|---|---|
| 3,648,238 A * | 3/1972 | Yarrington | ..................... | 714/762 |
| 3,675,236 A * | 7/1972 | Shoap | ..................... | 341/97 |
| 3,777,129 A * | 12/1973 | Mehta | ..................... | 716/136 |
| 4,566,064 A * | 1/1986 | Whitaker | ..................... | 326/38 |
| 5,325,083 A | 6/1994 | Nassar et al. | | |
| 5,370,015 A | 12/1994 | Moscatelli | | |
| 5,371,487 A | 12/1994 | Hoffman et al. | | |
| 5,406,860 A | 4/1995 | Easton et al. | | |
| 5,519,393 A | 5/1996 | Brandestini et al. | | |
| 5,561,416 A | 10/1996 | Marshall et al. | | |
| 5,601,513 A | 2/1997 | Arai et al. | | |
| 5,714,852 A | 2/1998 | Enderich | | |
| 5,736,701 A | 4/1998 | O'Brien et al. | | |
| 5,754,963 A | 5/1998 | Nunneley et al. | | |
| 5,847,344 A | 12/1998 | Denyer et al. | | |
| 6,018,294 A | 1/2000 | Vogel et al. | | |
| 6,069,988 A | 5/2000 | Kokura et al. | | |
| 6,072,390 A * | 6/2000 | Dourra et al. | ..................... | 340/456 |
| 6,223,113 B1 | 4/2001 | McCunn et al. | | |
| 6,253,136 B1 | 6/2001 | Stratton et al. | | |
| 6,324,040 B1 | 11/2001 | Saladin et al. | | |
| 6,376,929 B1 | 4/2002 | Nakajima et al. | | |
| 6,405,611 B1 | 6/2002 | DeJonge et al. | | |
| 6,411,879 B2 | 6/2002 | Kupper et al. | | |
| 6,492,900 B2 | 12/2002 | Rankin | | |
| 6,546,780 B1 | 4/2003 | Palfenier et al. | | |
| 6,628,215 B2 * | 9/2003 | Talwar et al. | ..................... | 341/107 |
| 6,631,489 B2 * | 10/2003 | Quach et al. | ..................... | 714/746 |
| 6,747,580 B1 * | 6/2004 | Schmidt | ..................... | 341/50 |
| 6,866,611 B2 | 3/2005 | Tsuzuki et al. | | |
| 6,904,823 B2 | 6/2005 | Levin et al. | | |
| 7,042,363 B2 | 5/2006 | Katrak et al. | | |
| 7,137,043 B1 * | 11/2006 | Kane et al. | ..................... | 714/57 |
| 7,142,132 B2 | 11/2006 | Katrak et al. | | |
| 7,242,329 B2 | 7/2007 | Katrak | | |
| 7,280,333 B2 | 10/2007 | Horsky et al. | | |
| 7,383,120 B2 | 6/2008 | Stockbridge et al. | | |

(Continued)

*Primary Examiner* — Jennifer Mehmood
(74) *Attorney, Agent, or Firm* — Rader, Fishman & Grauer PLLC

(57) ABSTRACT

A set of inputs each selectively provides a discrete signal, whereby the sensor inputs together provide a plurality of discrete signals. A memory includes instructions executable by a processor for receiving the discrete signals, identifying a bit pattern from the discrete signals, and determining a position of a physical member according to the bit pattern and an error condition detected from the discrete signals.

23 Claims, 7 Drawing Sheets

U.S. PATENT DOCUMENTS

| | | |
|---|---|---|
| 7,549,108 B2 | 6/2009 | Katrak et al. |
| 7,568,402 B2 * | 8/2009 | Robinette et al. ............... 74/335 |
| 7,747,904 B1 * | 6/2010 | DeMarco et al. ............... 714/48 |
| 2006/0082386 A1 | 4/2006 | Katrak et al. |
| 2006/0100758 A1 | 5/2006 | Katrak et al. |
| 2006/0149496 A1 | 7/2006 | Takeuchi |
| 2006/0179962 A1 | 8/2006 | Katrak et al. |
| 2006/0190142 A1 | 8/2006 | Katrak et al. |
| 2007/0101236 A1 | 5/2007 | Bauerle et al. |
| 2008/0077826 A1 * | 3/2008 | Kondajeri et al. .............. 714/57 |

* cited by examiner

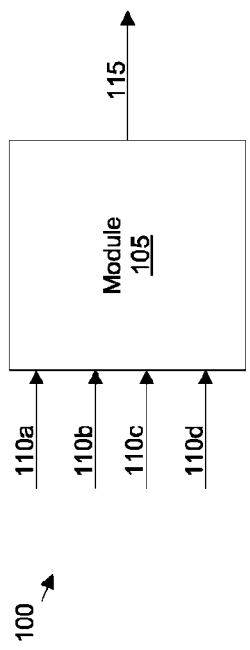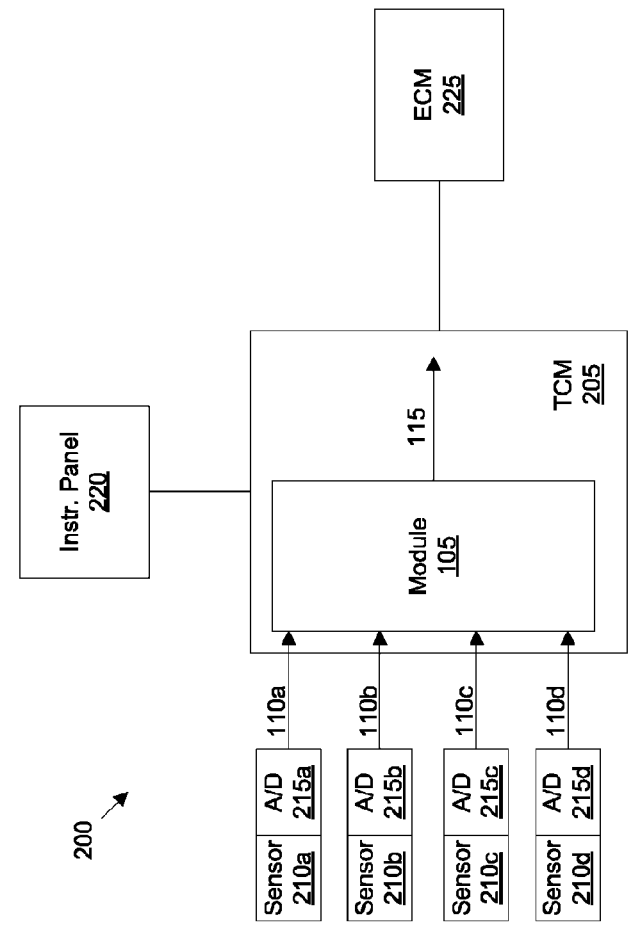

Fig. 4

| Present Position | Detent | | Detent | | Detent | | Detent | | Detent | | Detent |
|---|---|---|---|---|---|---|---|---|---|---|---|
| | P | P-R | R | R-N | N | N-D | D | D-H | H | H-L | L |
| Hex Value | 7 | 3 | 11 | 10 | 14 | 12 | 13 | 1 | 1 | 0 | 8 |
| Input 110a | 0 | 0 | 1 | 1 | 1 | 1 | 1 | 1 | 1 | 0 | 1 |
| Input 110b | 1 | 0 | 0 | 0 | 1 | 1 | 1 | 0 | 0 | 0 | 0 |
| Input 110c | 1 | 1 | 1 | 1 | 1 | 0 | 0 | 0 | 0 | 0 | 0 |
| Input 110d | 1 | 1 | 1 | 0 | 0 | 0 | 1 | 1 | 1 | 0 | 0 |

| Present Position | Detent P | Detent P-R | Detent R | Detent R-N | Detent N | Detent N-D | Detent D | Detent D-H | Detent H | Detent H-L | Detent L |
|---|---|---|---|---|---|---|---|---|---|---|---|
| Hex Value | 15 | 11 | 11 | 10 | 14 | 12 | 13 | 9 | 9 | 8 | 8 |
| Input 110a | 1 | 1 | 1 | 1 | 1 | 1 | 1 | 1 | 1 | 1 | 1 |
| Input 110b | 1 | | 0 | | 1 | 1 | 1 | | 0 | 0 | 0 |
| Input 110c | 1 | 1 | 1 | 1 | 1 | | 0 | 0 | 0 | 0 | 0 |
| Input 110d | 1 | 1 | 1 | | 0 | | 1 | 1 | 1 | | 0 |

⎫605

| Present Position | Detent P | Detent P-R | Detent R | Detent R-N | Detent N | Detent N-D | Detent D | Detent D-H | Detent H | Detent H-L | Detent L |
|---|---|---|---|---|---|---|---|---|---|---|---|
| Hex Value | 7 | 7 | 15 | 14 | 14 | 12 | 13 | 5 | 5 | 4 | 12 |
| Input 110a | 0 | | 1 | 1 | 1 | 1 | 1 | | 0 | | 1 |
| Input 110b | 1 | 1 | 1 | 1 | 1 | 1 | 1 | 1 | 1 | 1 | 1 |
| Input 110c | 1 | 1 | 1 | 1 | 1 | | 0 | 0 | 0 | 0 | 0 |
| Input 110d | 1 | 1 | 1 | | 0 | | 1 | 1 | 1 | | 0 |

⎫610

| Present Position | Detent P | Detent P-R | Detent R | Detent R-N | Detent N | Detent N-D | Detent D | Detent D-H | Detent H | Detent H-L | Detent L |
|---|---|---|---|---|---|---|---|---|---|---|---|
| Hex Value | 7 | 3 | 11 | 10 | 14 | 14 | 15 | 1 | 3 | 2 | 10 |
| Input 110a | 0 | | 1 | 1 | 1 | 1 | 1 | | 0 | | 1 |
| Input 110b | 1 | | 0 | | 1 | 1 | 1 | | 0 | 0 | 0 |
| Input 110c | 1 | 1 | 1 | 1 | 1 | 1 | 1 | 1 | 1 | 1 | 1 |
| Input 110d | 1 | 1 | 1 | | 0 | | 1 | 1 | 1 | | 0 |

⎫615

| Present Position | Detent P | Detent P-R | Detent R | Detent R-N | Detent N | Detent N-D | Detent D | Detent D-H | Detent H | Detent H-L | Detent L |
|---|---|---|---|---|---|---|---|---|---|---|---|
| Hex Value | 7 | 3 | 11 | 11 | 15 | 13 | 13 | 1 | 1 | 1 | 9 |
| Input 110a | 0 | | 1 | 1 | 1 | 1 | 1 | | 0 | | 1 |
| Input 110b | 1 | | 0 | | 1 | 1 | 1 | | 0 | 0 | 0 |
| Input 110c | 1 | 1 | 1 | 1 | 1 | | 0 | 0 | 0 | 0 | 0 |
| Input 110d | 1 | 1 | 1 | 1 | 1 | 1 | 1 | 1 | 1 | 1 | 1 |

⎫620

Legend

 STB

 Error detected

Fig. 6

| Present Position | Detent | P-R | Detent | R-N | Detent | N-D | Detent | D-H | Detent | H-L | Detent |
|---|---|---|---|---|---|---|---|---|---|---|---|
| | P | | R | | N | | D | | H | | L |
| Hex Value | 7 | 3 | 3 | 2 | 6 | 4 | 5 | 1 | 1 | 0 | 0 |
| Input 110a | 0 | 0 | 0 | 0 | 0 | 0 | 0 | 0 | 0 | | 0 |
| Input 110b | 1 | | 0 | | 1 | 1 | 1 | | 0 | 0 | 0 |
| Input 110c | 1 | 1 | 1 | 1 | 1 | 0 | 0 | 0 | 0 | 0 | 0 |
| Input 110d | 1 | 1 | 1 | | 0 | | 1 | 1 | 1 | | 0 |

⎬ 705

| Present Position | Detent | P-R | Detent | R-N | Detent | N-D | Detent | D-H | Detent | H-L | Detent |
|---|---|---|---|---|---|---|---|---|---|---|---|
| | P | | R | | N | | D | | H | | L |
| Hex Value | 3 | 3 | 11 | 10 | 10 | 8 | 9 | 1 | 1 | 0 | 8 |
| Input 110a | 0 | | 1 | 1 | 1 | 1 | 1 | | 0 | | 1 |
| Input 110b | 0 | 0 | 0 | 0 | 0 | 0 | 0 | 0 | 0 | 0 | 0 |
| Input 110c | 1 | 1 | 1 | 1 | 1 | 0 | 0 | 0 | 0 | 0 | 0 |
| Input 110d | 1 | 1 | 1 | | 0 | | 1 | 1 | 1 | | 0 |

⎬ 710

| Present Position | Detent | P-R | Detent | R-N | Detent | N-D | Detent | D-H | Detent | H-L | Detent |
|---|---|---|---|---|---|---|---|---|---|---|---|
| | P | | R | | N | | D | | H | | L |
| Hex Value | 5 | 1 | 9 | 8 | 12 | 12 | 13 | 1 | 1 | 0 | 8 |
| Input 110a | 0 | | 1 | 1 | 1 | 1 | 1 | | 0 | | 1 |
| Input 110b | 1 | | 0 | | 1 | 1 | 1 | | 0 | 0 | 0 |
| Input 110c | 0 | 0 | 0 | 0 | 0 | 0 | 0 | 0 | 0 | 0 | 0 |
| Input 110d | 1 | 1 | 1 | | 0 | | 1 | 1 | 1 | | 0 |

⎬ 715

| Present Position | Detent | P-R | Detent | R-N | Detent | N-D | Detent | D-H | Detent | H-L | Detent |
|---|---|---|---|---|---|---|---|---|---|---|---|
| | P | | R | | N | | D | | H | | L |
| Hex Value | 6 | 2 | 10 | 10 | 14 | 12 | 12 | 0 | 0 | 0 | 8 |
| Input 110a | 0 | | 1 | 1 | 1 | 1 | 1 | | 0 | | 1 |
| Input 110b | 1 | | 0 | | 1 | 1 | 1 | | 0 | 0 | 0 |
| Input 110c | 1 | 1 | 1 | 1 | 1 | 0 | 0 | 0 | 0 | 0 | 0 |
| Input 110d | 0 | 0 | 0 | 0 | 0 | 0 | 0 | 0 | 0 | 0 | 0 |

⎬ 720

Legend

 STG

 Error detected

DISCRETE SENSOR INPUTS

BACKGROUND

It is often useful to detect the position of a knob, lever, or other mechanism. For example, the vast majority of vehicles today employ automatic transmissions. A driver may use a lever or the like to direct the automatic transmission to change gears. Sensors may be used to detect a position of the lever, and hence detect the driver's intent with respect to the status of the vehicle's transmission, i.e., how the driver intends the vehicle engine to be presently geared.

For example, a driver of a passenger car may generally select park, reverse, neutral, drive, and low as positions of a selection mechanism for an automatic transmission. A driver of a medium duty or heavy-duty truck may select park, reverse, neutral, drive, hold, and low as positions of a selection mechanism for an automatic transmission. In either case, the selection mechanism is generally biased so that the knob, lever, etc., used in the selection mechanism naturally settles in a detent position, e.g., park, reverse, etc., when moved. However, when a driver is in the act of moving the knob, lever, etc., the selection mechanism may be in a transition position between two detent positions.

By analyzing sensor inputs to determine a position of a selection mechanism, a processor can provide appropriate instructions for a device to act according to the position of the selection mechanism. For example, when a driver moves an automatic transmission selector from "park" to "reverse," a transmission control module (TCM) may detect a new position of the automatic transmission selector, e.g., reverse, and may accordingly instruct an automatic transmission to transition a vehicle from a "park" state to a "reverse" state.

Unfortunately, present mechanisms for determining a position of a selection mechanism are generally lacking with respect to detection of errors and failure states. Further, present mechanisms for determining a position of a selection mechanism lack robustness. For example, although it is critical to safe operation of a vehicle to be able to detect a driver's intent with respect to the state of an automatic transmission, present arrangements of sensors do not necessarily provide assurance that the driver's intent will be properly detected. And even when errors and failures states are detected, present mechanisms lack ways of determining whether such error or failure state is critical, e.g., whether upon an error or failure state vehicle operation must cease, or may be allowed to continue for a period of time. Further, it is at present generally difficult, if not impossible, to operate a vehicle once error conditions have been detected in a vehicle, e.g., in an automatic transmission selector detection mechanism.

BRIEF DESCRIPTION OF THE DRAWINGS

FIG. 1 illustrates an exemplary sensor input system.

FIG. 2 illustrates an exemplary automatic transmission selector position detection system.

FIG. 4 illustrates an exemplary table for analyzing sensor inputs and determining a position of a selector mechanism such as a shift lever.

FIG. 6 includes exemplary tables illustrating short to battery (STB) conditions in respective inputs.

FIG. 7 includes exemplary tables illustrating short to ground (STG) conditions in respective inputs.

DETAILED DESCRIPTION OF PREFERRED EMBODIMENTS

System Overviews

Figure 3:
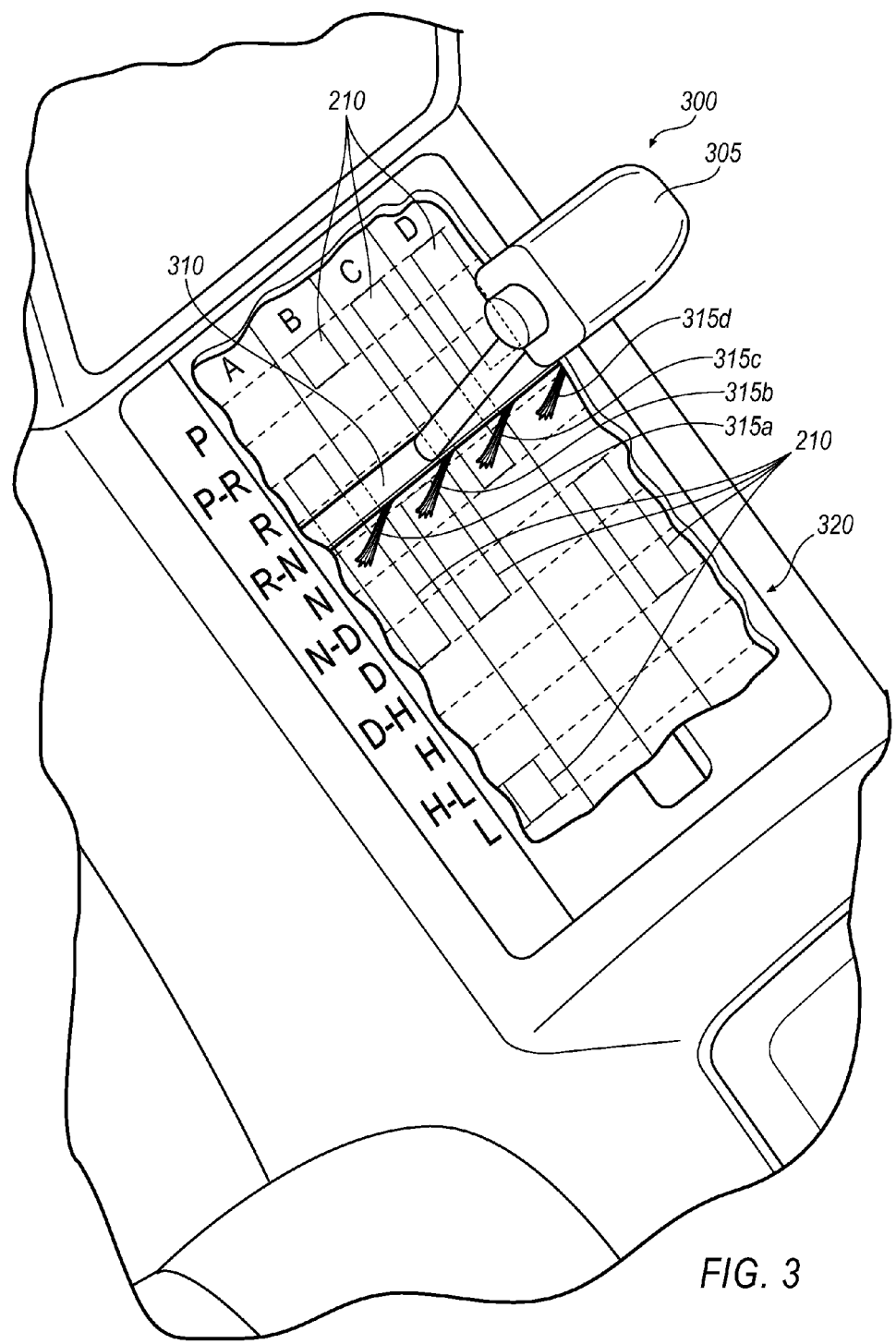
FIG. 3 illustrates an exemplary automatic transmission selector mechanism.

FIG. 1 illustrates an exemplary sensor input system 100. A sensor detection module 105 receives sensor inputs 110a-d, and provides an output instruction 115. Sensor inputs 110 generally provide a digital signal, e.g., a binary zero or binary one. Thus, sensor inputs 110 may be said to be discrete. Module 105 generally includes a processor and a memory, the memory storing instructions executable by the processor for, among other things, analyzing sensor inputs 110a-d and determining, based on the sensor inputs 110, an appropriate output instruction 115. For example, output instruction 115 may include an instruction to control a vehicle transmission based on a position of an automatic transmission selector position detected according to sensor inputs 110. That is, if a vehicle driver has placed an automatic transmission selector in a "reverse" position, output instruction 115 may include an instruction for a vehicle transmission to be placed in a "reverse" state.

The memory included in module 105 may include a variety of computer-readable media such as are discussed further below. Further, in some cases, module 105 may simply include a set of instructions stored in a memory and executable by a processor, where the processor and/or the memory are used for operations other than operations attributable to module 105. For example, such an arrangement is described below with respect to FIG. 2.

Module 105 is often included in a vehicle. Further, as described in more detail below, sensor inputs 110 may result from detecting a position of an automatic transmission selector mechanism in the vehicle. However, sensor system 100 could be deployed in other contexts, wherever a position of a knob, a lever, or other selector mechanism may be detected.

FIG. 2 illustrates an exemplary automatic transmission position selector detection system 200. In the detection system 200, sensor detection module 105 is included in a transmission control module (TCM) 205. Sensors 210a-d provide sensor inputs 110a-d, e.g., sensors 210a-d may output an electrical voltage that is converted respectively by analog to digital converters 215a-d to provide sensor inputs 110a-d respectively, whereby inputs 110 may provide a digital signal, e.g., a binary one or binary zero, on a continuous or near continuous basis depending on output from an associated sensor 210.

Further, instead of simple contacts, other kinds of devices can be used as sensors 210. Thus, in some implementations, analog-to-digital converters 215 will be omitted. For example, Hall Effect sensors, pulse width modulation (PWM) sensors, etc. could be used in lieu of the sensors 210 described in the preceding paragraph. Further, inputs 110 could be configured to provide discrete high and low voltages. Thus, references to binary inputs 110 herein should generally be understood to include any medium providing a discrete input that may be provided by sensors 210. Moreover, discussions herein of binary ones and zeros, bit patterns, digital inputs, etc., should be understood to encompass any sets of discrete inputs having two values, e.g., a high voltage and a low voltage, PWM duty cycles of different lengths, signals at high and low frequencies, etc.

For example, sensors 210 may be electrical contacts or the like that, when a selector mechanism such as a shift lever, knob, etc., is positioned over the contact, e.g., as discussed below with respect to FIG. 3, are part of a closed circuit producing an output voltage to analog to digital converters 215. Accordingly, as provided by sensors 210 through analog to digital converters 215, sensor inputs 110 are discrete signals and generally may be either a binary zero or a binary one, depending on whether the respective sensor 210 is producing an output voltage. Similarly, if sensor 210 used PWM, then detection of a binary zero or a binary one could be based on a duty cycle of the PWM signal.

TCM 205 generally includes a processor and a memory. Sensor detection module 105 may include a set of instructions stored in the memory of the TCM 205, and executable by the processor of the TCM 205. Accordingly, TCM 205 may provide output instruction 115 to other modules in a vehicle, such as instrument panel 220 and engine control module (ECM) 225. Instruction 115 may be provided over a vehicle communications bus or other linkage according to the known controller area network (CAN) protocol, or some other suitable communications protocol or mechanism.

Selector Mechanism

FIG. 3 illustrates an exemplary automatic transmission selector mechanism 300. Shift lever 305 is attached to brush plate 310 in a substantially perpendicular manner. Brushes 315a-d extend from brush plate 310, such that the brushes 315 may variously make contact with sensors 210a-d disposed in sensor field 320. Brushes 315 are generally formed of a conductive metal or some other electrically conductive material, such that when a brush 315 makes contact with a sensor 210, an electrical circuit may be formed. Accordingly, by applying a predetermined voltage to brushes 315, when a brush 315 makes contact with a sensor 210, the sensor 210 may output a voltage, e.g., such as may be converted by an analog to digital converter 215 to a binary sensor input 110.

As illustrated in FIG. 3, sensors 210 may be disposed contiguously to detect various positions of shift lever 305, or may be contiguously absent. Having sensors 210 be contiguous, or contiguously absent, between states may further facilitate the detection of errors, because contiguous or contiguously absent sensors 210 will be expected to provide a continuous input 110, e.g., a continuous binary one or binary zero. If, for example, input 110a provides a binary zero during a transition from a first state to a second state where sensor 210a is disposed to provide input 110a for both the first state and the second state, then the detection of the binary zero should give rise to an error condition. Such an error condition could arise, for example, if a sensor 210 contact is worn or damaged, and unable to provide continuously the expected signal. In such event, detection of the error condition may be important because immediate repair or replacement of parts in system 200 may be warranted.

Brushes 315 are generally substantially aligned and are interlocked to assure that each of brushes 315a, 315b, 315c, and 315d contacts respective sensors 210a, 210b, 210c, and 210d, simultaneously or nearly simultaneously where such sensors are disposed to receive contacts with brushes 315a, 315b, 315c, and 315d, e.g., as shown in FIG. 3. If such contact is not simultaneous or nearly simultaneous, module 105 may detected unexpected and/or incorrect bit patterns, and may report error conditions.

Systems 100 and 200 may be used to detect a position of physical members other than shift lever 305. For example, knobs, switches, and the like may have different positions that may be detected according to the systems and methods described herein. Accordingly, descriptions herein of detecting a position of shift lever 305 are intended to be applicable to other physical members as well as shift lever 305.

Position Determination Table

FIG. 4 illustrates an exemplary table 400 for analyzing sensor inputs 110 and determining a position of a selector mechanism such as shift lever 305. Table 400 illustrates values for sensor inputs 110a-d associated with each of the possible present positions of shift lever 305. That is, in the present illustration, shift lever 305 has possible present detent positions P, R, N, D, H, and L. Accordingly, shift lever 305 further has possible transition positions P-R, R-N, N-D, D-H, and H-L. Thus, for example, when sensor detection module 105 detects a pattern of 0, 1, 1, 1 from inputs 110a, 110b, 110c, and 110d, respectively, module 105 determines that shift lever 305 is in a park position. Similarly, to provide another example, when sensor detection module 105 detects a pattern of 1, 1, 0, 0, from inputs 110a, 110b, 110c, and 110d, respectively, module 105 determines that shift lever 305 is in a transition position between the neutral position and the drive position. As can be seen, inputs 110 form a bit pattern, and thus can be represented as binary numbers. In the presently illustrated implementation, sensor 110a is designated as providing the most significant bit, and binary numbers made thus be read from top to bottom in each column in table 400, beginning with input 110a. For convenience, values of these binary numbers are represented as hexadecimal values, as shown in table 400.

As is known, hexadecimal numbers may be represented according to a variety of conventions. For example, 0 through 9 may be represented as 0, 1, 2, 3, 4, 5, 6, 7, 8, and 9, just as they would be in a base 10 system. Further, the numbers represented in a base 10 system by 10, 11, 12, 13, 14, and 15 could be respectively represented by the letters A, B, C, D, E, and F. Sometimes hexadecimal numbers are indicated by the presence of a prefix, such as "0x." In the present specification, hexadecimal numbers, i.e., numbers in a base 16 system, are indicated simply by the prefix "hexadecimal" preceding a decimal value. For example, a hexadecimal equivalent of the base 10 number 11, which in some conventions would be indicated as "A," "0x0A", etc., will be indicated as "hexadecimal 11." Further, in the drawings, hexadecimal numbers are sometimes indicated by the label "hex value."

Sensor detection module 105 could be implemented to detect bit patterns other than those illustrated in table 400. However, certain principles in the creation of table 400 enhance the robustness and reliability of sensor detection module 105. For example, it is more important to be able to properly detected detent positions of shift lever are 305 than it is to be able to detect transition positions. Further, detection of park, reverse, neutral, and drive states is more important than detection of hold or low states. Therefore, for each detent position, three of the four inputs 110 are required to be the same, i.e., either three zeros or three ones, for the detent position to be detected. Moreover, each of park, reverse, neutral, and drive requires three ones, because ones generally reflect what is referred to as a high asserted state. That is, when an input 110 is one, instead of zero, this generally means that sensor 210 has provided a voltage output. A zero, reflecting that sensor 210 has not provided an output voltage, is more likely to be provided erroneously, e.g., because of an improperly open circuit, than a one is likely to be provided erroneously.

In the presently illustrated exemplary implementation, detent positions in table 400 are separated from one another by Hamming distances of two. A Hamming distance refers to the number of characters that are different from one another in corresponding positions in strings of equal length. For example, "101" and "001" have a Hamming distance of one. "101" and "000" have a Hamming distance of two. Having a Hamming distance of two between detent positions provides further assurance that detent positions may be distinguished from one another, and that movements of shift lever 305 will not be improperly reported.

Karnaugh Map

Figure 5:
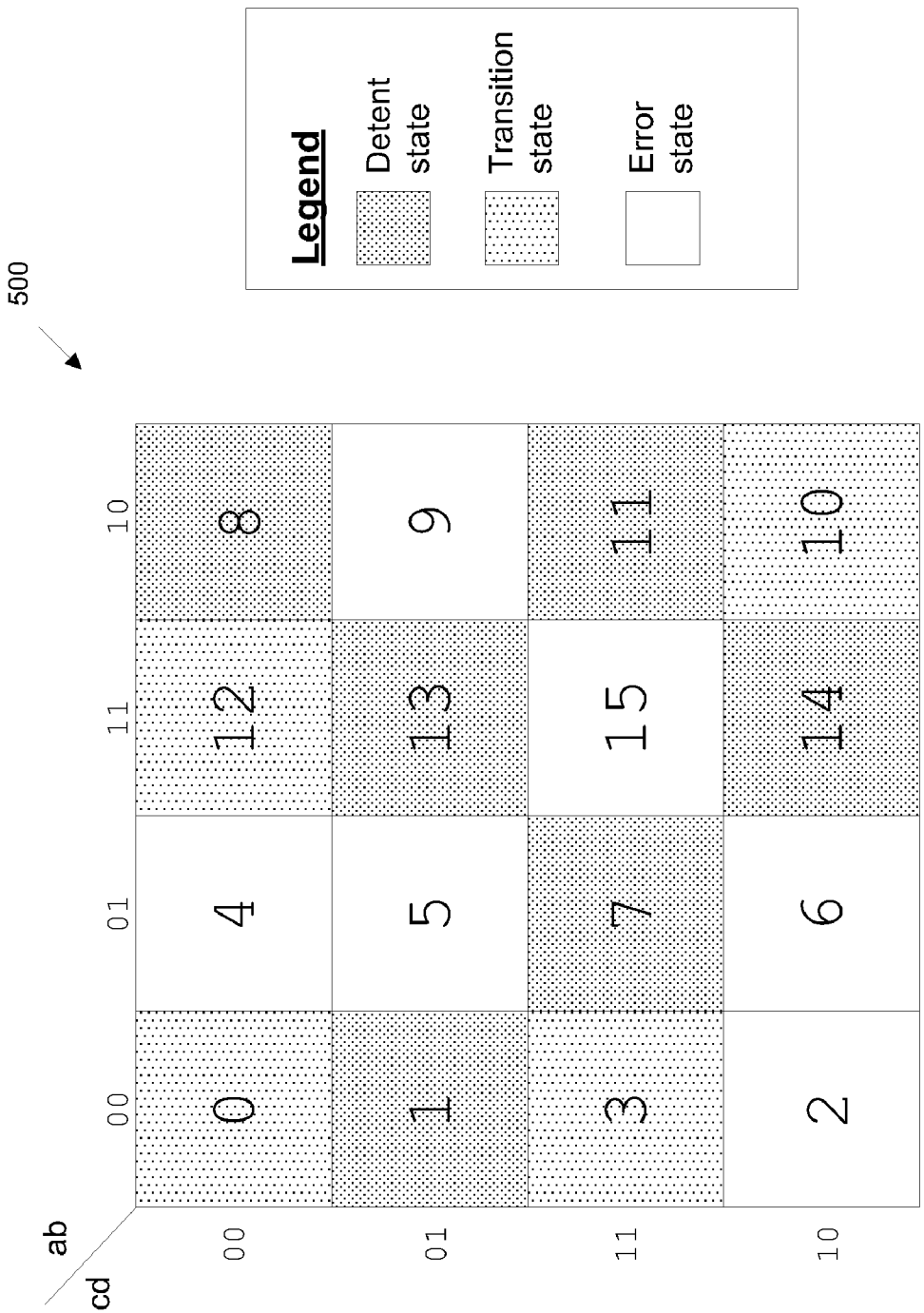
FIG. 5 illustrates an exemplary Karnaugh map used in the creation of the table illustrated in FIG. 4.

FIG. 5 illustrates an exemplary Karnaugh map 500 used in the creation of the table illustrated in FIG. 4. A Karnaugh map provides a representation of a set of binary numbers according to Gray code, in which numbers adjacent to one another on the map vary by one bit, or are said to have a Hamming distance of one.

As seen in FIG. 5, map 500 represents numbers from 0 to 15. Initially, 7, 11, 13, and 14 were chosen for detent states, because the binary representation of each of these three numbers includes three ones. Because the presently illustrated implementation includes six detent positions of shift lever 305, two additional detent states were necessary. Therefore, 1 and 8 were also chosen for detent states, because the binary representations of each of these numbers include three zeros. Accordingly, presently illustrated implementations have what might be referred to as a "high asserted ⅓ Karnaugh feature." That is, detent positions are represented by numbers on a Karnaugh map whose bit patterns include either one high asserted state, and three open states, or three high asserted states, and one open state.

As mentioned above, the detent states deemed to be more important for accurate detection were assigned the numbers whose binary representation includes three ones. Further, specific bit patterns were assigned to specific detent positions, in combination with bit patterns of assigned to transition positions of shift lever 305, in order to provide what is sometimes referred to as a "make after break" feature.

The make after break feature means that, in transitions between detent positions, preferably in every transition between detent positions, one input 110 that was in a high asserted state, e.g., a binary one, "breaks" to a low or non-asserted state, e.g., a binary zero. For example, as seen in FIG. 4, input 110*b* breaks from a binary one in the "park" state to a binary zero in the "reverse" state.

The make after break feature further means that, in transitions between detent positions, one input 110 that was in a low or non-asserted state, e.g., a binary zero, is "made" to a high asserted states, e.g., a binary one, that only after another input "breaks" as described in the preceding paragraph. For example, as seen in FIG. 4, input 110*a* "makes" from a binary zero in the "park" state to a binary one in the "reverse" state, such "make" being allowed after input 110*b* "breaks" from the binary one in the "park" state to the binary zero in the "reverse" state.

In the presently illustrated implementation, the make after break feature is bidirectional. Thus, for example, again with reference to FIG. 4, if shift lever 305 transitions from the reverse state to the park state, input 110*a* must break from binary one to binary zero before input 110*b* is made from binary zero to binary one. An advantage of the make after break feature, and an advantage of having the make after break feature the bidirectional, is to further ensure that a detected transition of shift lever 305 from a first state, e.g., reverse, to a second state, e.g., neutral reflects an action actually taken by a vehicle driver.

Accordingly, for transition positions of shift lever 305, bit patterns having two ones were selected where possible to support make after break functionality, and also to use the maximum number of high asserted states available, where possible. In the case of the D-H transition from drive to hold, the same value, 1, was selected for both states partly to satisfy requirements for make after break functionality, and partly because the hold state generally requires holding a transmission in a current gear—or current range of gears, and therefore there is not a significant downside to having the D-H and H states be the same.

Further, the transition from drive to hold, as seen in FIG. 4, provides an example of a transition between detent states in which the make after break feature is not provided. That is, as can be seen in FIG. 4, the D state is represented with the bit pattern 1, 1, 0, 1, and the D-H and H states are represented by the bit pattern 0, 0, 0, 1. Thus, in the transition from D to H, inputs 110*a* and 110*b* "break" but no inputs 110 "make." In this case, it is important that inputs 110*a* and 110*b* break simultaneously or nearly simultaneously. Otherwise, module 105 may detect an error condition. For example, if input 110*a* breaks before input 110*b*, module 105 may detect the bit pattern 0, 1, 0, 1, or hexadecimal 5. If input 110*b* breaks before input 110*a*, module 105 may detect the bit pattern 1, 0, 0, 1, or hexadecimal 9. As discussed in the next paragraph, in the presently illustrated implementation, hexadecimal 5 and hexadecimal 9 each represent error states. Therefore, if inputs 110*a* and 110*b* do not break simultaneously or nearly simultaneously in the transition from the D state to the D-H and H states, module 105 may detect an error.

Returning to FIG. 5, non-shaded squares of map 500 represents error states. That is, in the presently illustrated implementation, sensors 210 and sensor inputs 110 are arranged in a manner such that inputs 110 will never, during normal operation of shift lever 305, form a bit pattern representing the numbers 2, 4, 5, 6, 9, or 15. Advantageously, therefore, if sensor detection module 105 ever detects any of the foregoing numbers resulting from inputs 110, it may immediately be determined that an error condition exists. Note that, in implementations including more than six detent positions, some of the foregoing numbers could be used to represent the additional detent positions rather than error states. For example, 2 and 4 each include three low asserted states and could be used in implementations including eight detent positions.

Further, 0, 3, 10, and, 12, used for transition states, may also indicate error states in certain circumstances. For example, with reference to table 400, if shift lever 305 is in the hold position, and input 110*c* suffers a STB condition, then module 105 should detect a bit pattern that translates to a hexadecimal 3. Because a hexadecimal 3 cannot follow the hexadecimal 1 that indicates the hold position according to table 400, module 105 should in this circumstance associate the hexadecimal 3 with an error condition. The foregoing also provides an example of how the particular input 110 associated with an error condition may be detected.

Map 500 is a 4-by-4 map, thereby including 16 states. A 4-by-4 map is mandated in the presently illustrated implementation, because system 100 includes four inputs 110. However, system 100 could have more or less than four inputs 110. If system 100 includes two inputs, then a 2-by-2 map could be used, whereas an 8-by-8 map could be used for an eight-input system. Here, the four inputs 110 were chosen because map 500 must account for 11 possible positions of shift lever 305, or 10 possible positions if two are combined, as the drive to hold transition position and the hold position have been effectively combined, as illustrated in FIG. 4. As discussed below, it is advantageous to have one and preferably more values in map 500 that are not used to detect a position of shift lever 305, because of such left over values may be used for error detection.

Error Condition Tables

FIGS. 6 and 7 illustrate various error conditions that may arise in the presently illustrated implementation. FIG. 6 includes exemplary tables 605, 610, 615, and 620 illustrating short to battery (STB) conditions in each of inputs 110*a*, 110b, 110c, and 110d, respectively. FIG. 7 includes exemplary tables 705, 710, 715, and 720 illustrating short to ground (STG) conditions in each of inputs 110a, 110b, 110c, and 110d, respectively.

Turning to FIG. 6, with respect to table 605, it can be seen that input 110a provides a binary one regardless of the position of shift lever 305. Accordingly, input 110a may be said to be in a STB condition. The STB condition is sometimes also referred to as a "short to reference" condition. Accordingly, input 110a provides no helpful information for module 105 to determine a position of shift lever 305. However, a vehicle is generally in park when ignition is initiated. Thus, table 400 has been created to provide for detection of an STB condition upon vehicle ignition. That is, as mentioned above, in the presently illustrated implementation, whenever the bit pattern provided by inputs 110a-d represents the number 15, it is clear that an error condition exists. As seen in table 605, inputs 110a-d provide the number 15 when an STB condition exists and shift lever 305 is in the park position.

Table 605 also illustrates the robustness of system 200 because it can be seen from table 605 that, even when an STB condition exists with respect to input 110a, the position of shift lever 305 may still be detected. That is, when a vehicle ignition is initiated, and the bit pattern formed by inputs 110 is represented by the number 15, module 105 determines that an STB condition exists in input 110a. Then, as seen in table 605, positions of shift lever 305 may be detected taking into account the STB condition, noting that in the drive to hold transition position, and the hold detent position, the bit pattern formed by inputs 110 will represent the number 9, instead of the number 1 (as illustrated in table 400 and FIG. 4).

Similarly, while STB conditions with respect to inputs 110b, 110d, and 110d will not be detected upon vehicle ignition, tables 610, 615, and 620, respectively illustrate that an STB condition with respect to any of inputs 110b, 110d, and 110d may be detected and then used for operation of a vehicle, including detecting positions of shift lever 305. Therefore, advantageously, a vehicle may continue operating, e.g., in a fail-soft mode, even after an error condition is detected. In a fail-soft mode, a vehicle may be allowed to continue its mission, e.g., to arrive at its destination, before a detected error prevents further operation of the vehicle. Of course, a fail-safe mode is also possible. In a fail-safe mode, vehicle operation may be shut down immediately when an error is detected or a limited number of vehicle operation options may be presented to a vehicle operator (e.g., only a sub-set of gears is made available)

Turning to FIG. 7, which illustrates a short to ground (STG) condition with respect to various inputs 110, with respect to table 705, it can be seen that input 110a provides a binary zero regardless of the position of shift lever 305. Accordingly, input 110a may be said to be in a STG condition. Accordingly, input 110a provides no helpful information for module 105 to determine a position of shift lever 305. As reflected by table 705, a STG condition will not be detected when vehicle ignition is first initiated, if the STG condition exists with respect to input 110a. However, the STG condition will be detected when the shift lever 305 is moved from reverse to neutral. Moreover, if a STG condition exists with respect to any of inputs 110b, 110c, or 110d, such error condition will be detected when the vehicle is in park when vehicle ignition is first initiated, as can be seen in tables 710, 715, and 720.

As described above with respect to STB conditions, tables 705, 710, 715, and 720, illustrate that vehicle operation can proceed, in a fail-soft mode, even after a STG error has been detected.

Process Flow

Figure 8:
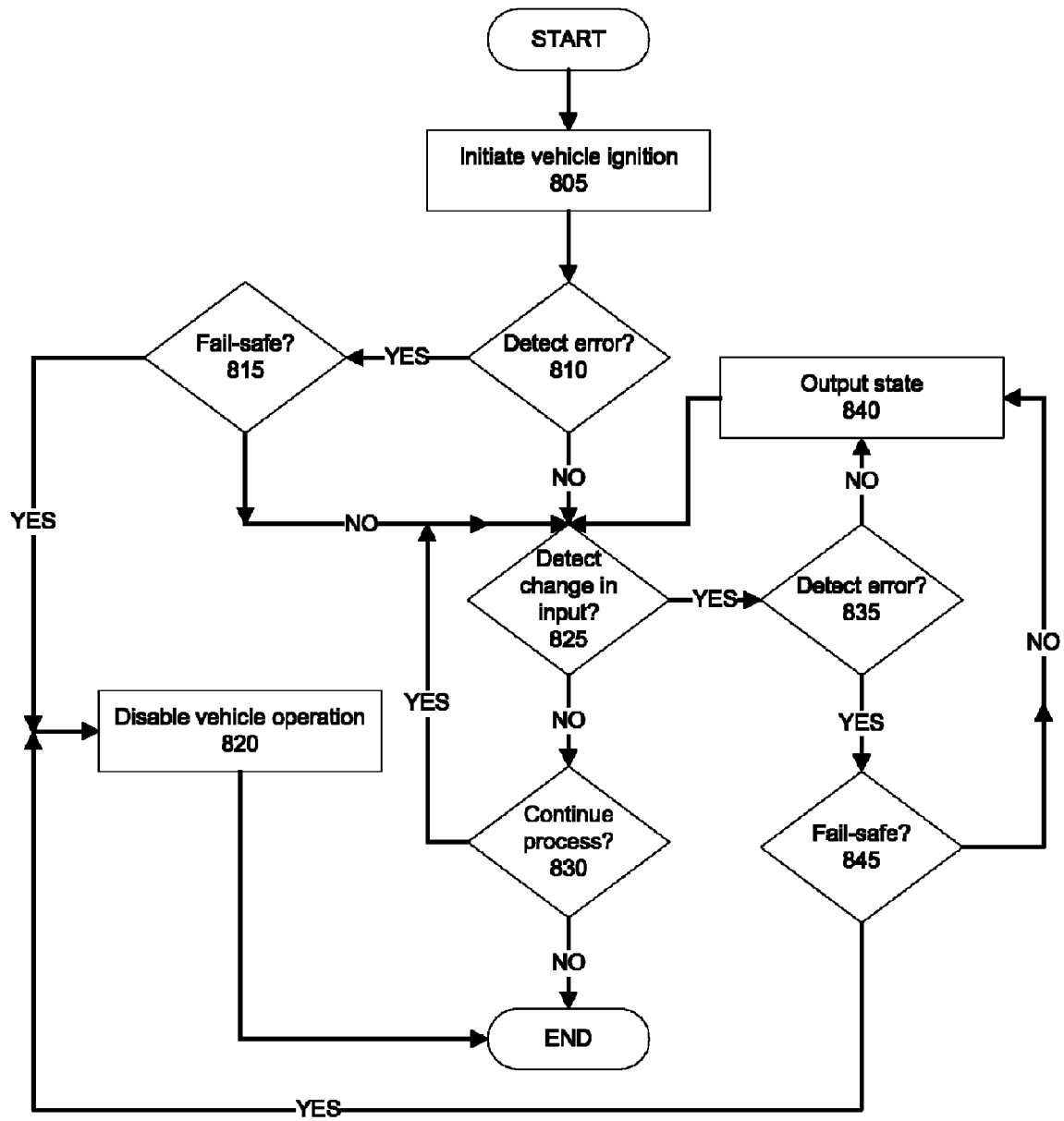
FIG. 8 illustrates an exemplary process for detecting sensor inputs.

FIG. 8 illustrates an exemplary process 800 for detecting sensor 210 inputs 110. Some or all of process 800 could be implemented as computer-executable instructions included in sensor detection module 105.

Process 800 begins in a step 805, when sensor detection module 105 detects that a vehicle ignition has been initiated. Again, it is emphasized that, although the presently illustrated implementation is described with reference to a system 200 in a vehicle, sensor detection system 100 could be deployed in other contexts.

Next, in step 810, module 105 determines whether an error condition has been detected with respect to any of inputs 110. For example, as noted above with respect to table 605 shown in FIG. 6, if module 105 detects the number 15 based on the binary representation of inputs 110 immediately upon vehicle ignition, module 105 may reach a determination that a short to battery error condition exists. For another example, if each of inputs 110 is a binary zero, or if the hexadecimal number based on the bit pattern of inputs 110 is other than 7, the expected value as seen in table 400 shown in FIG. 4, then module 105 may reach a determination that an unknown error condition exists.

Advantageously for purposes of identifying and diagnosing faulty sensors 210 and/or inputs 110, module 105 in many instances may identify the specific input 110 responsible for the error condition. For example, if module 105 detects a hexadecimal 15 immediately on vehicle ignition, when shift lever 305 is expected to be in the park position, then module 105 may determine that input 110a is faulty. That is, when shift lever 305 is in the park position, input 110a is expected to provide a binary zero. However, if module 105 detects a hexadecimal 15, then input 110a must be providing a binary 1, which is an error assuming that shift lever 305 is in the park position. Module 105 may provide diagnostic information, e.g., data concerning inputs 110 that have been identified to be provide erroneous data, to diagnostic applications and/or devices, via a communications bus in a vehicle and/or like mechanisms. For example, a general purpose or specialized computing device including a diagnostic application may receive communications from module 105 through a communications bus in a vehicle that is connected to a wireless or wired network.

Returning to process 800, if module 105 determines that an error condition exists, and then step 815 is executed next. However, if no error is detected, then step 825 is executed following step 810.

In step 815, module 105 determines whether to apply a fail-safe or fail-soft mode. In some implementations, not reflected in FIG. 8, a fail-safe mode is always applied. In a fail-safe mode, any error condition is unacceptable. Thus, in some implementations, any error condition is deemed unacceptable. However, in the presently illustrated implementation, module 105 may identify certain errors as acceptable for operation in fail-soft mode. In fail-soft mode, system 200 may continue to operate, e.g., for a period of time until a vehicle may return to a location where repairs are possible.

Module 105 may be programmed with certain criteria for determining whether to apply a fail-safe or fail-soft mode. For example, it may be that, although an error condition is detected with respect to one input 110, operations of system 200 may nonetheless proceed, because positions of shift lever 305 may still be determined. For example, if a hexadecimal 15 is detected upon vehicle ignition, a STB error condition may be detected. However, with reference to table 605 in FIG. 6, positions of shift lever 305 may nonetheless be detected when input 110a is in a STB error state. Accordingly, when such an error condition exists, system 200 may nonetheless proceed in a fail-soft mode. However, if a hexadecimal zero is detected upon vehicle ignition, then it may be inferred that none of inputs 110 are functioning properly, and it is not possible for module 105 to accurately determine positions of shift lever 305. In this case, then, a fail-safe state should be applied.

In general, a fail-soft mode may be applied when, even though an error condition has been detected, movement of shift lever 305 will generate a predictable sequence of hexadecimal numbers representing inputs 110. For example, in the presently illustrated implementation, as seen in table 400 and FIG. 4, movement of shift lever 305 through all positions, including detent positions and transition positions, from the park position through the low position, will generate a particular sequence of hexadecimal numbers. Specifically, in the presently illustrated implementation, the sequence is 7 (park), 3 (transition park to reverse), 11, (reverse), 10 (transition reversed to neutral), 14 (neutral), 12 (transition neutral to drive), 13 (drive), 1 (transition drive to hold), 1 (hold), 0 (transition hold to low), 8 (low). Thus, looking at the example provided by table 605, when a STB error condition exists with respect to input 110a, the number 15 replaces the number 7, and the number 9 replaces the number 1. Therefore, as illustrated in table 605, module 105 may use the following sequence to determine positions of shift lever 305: 15 (park), 3 (transition park to reverse), 11, (reverse), 10 (transition reversed to neutral), 14 (neutral), 12 (transition neutral to drive), 13 (drive), 9 (transition drive to hold), 9 (hold), 0 (transition hold to low), 8 (low).

Other examples of when a fail-soft mode may be applied may be seen in FIGS. 6 and 7, For example, in table 610 it may be seen that the appearance of a hexadecimal 15, instead of a hexadecimal 11, when shift lever 305 is moved from either of the park or neutral positions to the reverse position, indicates an error. In fact, as noted above, in the presently illustrated implementation, a hexadecimal 15 always indicates an error. Similarly, the appearance of a hexadecimal 5 when shift lever 305 is moved from the drive position, and is in the transition position between the drive position and the hold position, indicates an error. In fact, as is seen in FIG. 5, a hexadecimal 5 always indicates an error. Accordingly, table 610 provides a sequence of hexadecimal numbers that may be used by module 105 to determine positions of shift lever 305, even when a STB error condition is present with respect to input 110b. Similar error states may be seen in other tables in FIGS. 6 and 7.

If module 105 determines to apply a fail-safe mode, then step 820 is executed next. Otherwise, step 825 is executed following step 815.

In step 820, module 105 causes system 200 to be disabled. In practice in the presently illustrated implementation, this means causing vehicle operation to be disabled. For example, module 105 could send an output instruction 115 to 18 control module 225 to disable agent operations. Following step 820, process 800 ends.

In step 825, which may follow any of steps 810, 815, or 830, sensor detection module 105 determines whether a change is detected with respect to any input 110. That is, as described above, each sensor 210, in conjunction with an associated analog to digital converter 215, will provide as an input 110 a binary zero or a binary one depending on whether the sensor 210 is in contact with a brush 315. When shift lever 305 is moved, respective sensors 210 in contact with respective brushes 315 may change, thus causing inputs 110 to change. Further, inputs 110 may change when an error condition arises. For example, with reference to table 615 in FIG. 6, if shift lever 305 is in the drive position, and a vehicle accordingly is in a drive state, and a STB condition then arises with respect to input 110c, a change in inputs 110 will be detected in step 825. However, such change will be detected because an error condition has arisen, not because a vehicle driver has moved shift lever 305. In any case, if a change in one or more of inputs 110 is detected in step 825, step 835 is executed next. Otherwise, step 830 is executed next.

In step 830, module 105 determines whether execution of process 800 is to continue. For example, if a vehicle including system 200 is powered off, module 105, and process 800, may cease operation, or module 105 may determine that process 800 is to be ended. In any case, if process 800 is not to continue after step 830, then process 800 ends. Otherwise, process 800 returns to step 825.

In step 835, which may follow step 825, module 105 determines whether the change in inputs 110 detected in step 825 is due to an error condition arising. For example, module 105 may include, or may have access to, tables such as those illustrated in FIGS. 4, 6 and 7. Such tables 400, 605, 610, 615, 620, 705, 710, 715, and 720, as discussed above, may be used to determine the existence of error conditions. For example, as noted above, table 615 could be used to detect a STB error condition when module 105 detects a hexadecimal 15 following a hexadecimal 13 indicating that shift lever 305 is in a drive position. To take another example, table 400 indicates that a reverse state is represented by hexadecimal 11, which may be followed by either a hexadecimal 3 for the P-R state, or a hexadecimal 10 for the R-N state. Accordingly, module 105 may perform a comparison of an old state with a new state, and may indicate an error condition if the new state does not properly follow the new state, e.g., according to table 400. To take yet another example, module 105 could detect that inputs 110 were all binary zeros or binary ones.

Another way in which an error condition could arise is based on the make after break feature discussed above. That is, module 105 might determine that a first input 110 has broken from a binary one to a binary zero, while a second input 110, which should have been made from a binary zero to a binary one, according to an association between the first and second input 110, has not done so. A failure of the make after break feature is a relatively serious failure, because module 105 cannot necessarily determine which of the two inputs 110 is providing bad data, or whether both are. Thus, with respect to fail-soft and fail-safe modes, discussed elsewhere, a failure of the make after break feature should generally be associated with a fail-safe mode.

As noted above with respect to step 810, in many implementations, where possible, module 105 will identify a specific input 110 responsible for an error condition arising, if module 105 detects an error condition. In general, information concerning error conditions and other information concerning operation of module 105 may be made available to diagnostic applications or the like. For example, in addition to reports of error conditions that have arisen and identification of specific inputs 110 that may have given rise to an error condition, module 105 may make available audit logs or the like providing information about states recorded for shift lever 305, e.g., what states were recorded and for what period of time, what was the order of states recorded, etc.

In any case, if an error is detected in step 835, step 850 is executed next. However, if no error is detected, step 840 is executed next.

If step 840 has been reached, then inputs 110 have changed, and module 105 has determined that no error condition exists, meaning that a change in position for shift lever 305 has occurred, or module 105 has determined to proceed in a fail-soft mode in step 845, meaning that a change in position for shift lever 305 may have occurred and/or that a failure of an input 110 may have been detected. In step 840, if no error condition was detected in step 835, module 105 determines this change in position for shift lever 305 according to table 400. However, if an error condition was detected in step 835, and module 105 determined to apply a fail-soft mode in step 845, then module 105 may use one of tables 605, 610, 615, 620, 705, 710, 715, and 720 to determine a position for shift lever 305, depending on the particular error condition determined to exist, e.g., a STB or STG in a particular input 110.

Accordingly, module 105 provides output instruction 115 to instruct TCM 205, ECM 225, instrument panel 220, etc. as appropriate, concerning the new state, e.g., the new position of shift lever 305. Accordingly, TCM 205, for example, may cause a vehicle to shift from a drive state to a neutral state, from a park states to a reverse state, etc., as appropriate. Note that, preferably, module 105 never provides instruction 115 to TCM 205 (or any other control device) when shift lever 305 is in a transition state. Thus, only when it is expected that shift lever 305 has completely moved from a first detent position to a second detent position does module 105 provide instruction 105, and does TCM 205 cause a vehicle transmission to shift gears.

Step 845 follows step 835 if module 105 has detected an error condition. In step 850, module 105 determines whether to apply a fail-safe or fail-soft mode based on the detected error condition in a manner as described above with respect to step 815. If a fail-safe mode is to be applied, step 820 is executed next. However, if a fail-soft mode is to be applied, step 840 is executed next.

As mentioned above, process 800 may end after either of steps 820 or 830.

CONCLUSION

Computer-executable instructions such as included in module 105 may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, and volatile media. Non-volatile media include, for example, optical or magnetic disks and other persistent memory. Volatile media include dynamic random access memory (DRAM), which typically constitutes a main memory. Common forms of computer-readable media include, for example, tangible media such as a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain systems, and should in no way be construed so as to limit the claimed invention.

Accordingly, it is to be understood that the above description is intended to be illustrative and not restrictive. Many systems and applications other than the examples provided could be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future systems. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites explicitly to the contrary.

What is claimed is:

1. A method, comprising:
    detecting a plurality of discrete signals, each of the discrete signals being received from a respective one of a plurality of inputs;
    identifying a detected bit pattern based on the discrete signals;
    detecting selectively an error condition, and identifying the error condition as one of at least one of a short to battery condition, a short to ground condition, and a failure of a make after break feature, according to the bit pattern; and
    determining an expected position of a physical member according to the bit pattern;
    wherein the make after break feature fails if one of the inputs that was in a high asserted state fails to break to a low or non-asserted state when the physical member moves from a first detent position to a second detent position.

2. The method of claim 1, wherein the physical member is a shift lever for an automatic transmission in a vehicle.

3. The method of claim 1, further comprising transmitting an instruction based on the position of the physical member.

4. The method of claim 1, further comprising determining a plurality of possible bit patterns, each of the possible bit patterns being a bit pattern for a possible combination of the discrete signals, and identifying the detected bit pattern by matching it to one of the possible bit patterns.

5. The method of claim 4, further comprising using a Karnaugh map for determining the plurality of possible bit patterns.

6. The method of claim 5, further comprising associating states in the Karnaugh map having a majority of bits being ones with combinations of the discrete signals that have been deemed to be more important than other combinations of the discrete signals.

7. The method of claim 6, wherein the combinations of the discrete signals that have been deemed to be more important are associated with detent positions of the physical member.

8. The method of claim 1, wherein the bit pattern is a combination of high asserted states.

9. The method of claim 1, further comprising:
detecting a second plurality of discrete signals, each of the second plurality of the discrete signals being received from a respective one of the inputs;
identifying a second detected bit pattern based on the second plurality of discrete signals;
determining whether an error condition exists according to the bit pattern;
if an error condition exists, considering whether the error condition warrants a fail-safe mode, considering whether the error condition warrants a fail-soft mode, and determining whether the error condition warrants one of the fail-safe mode and the fail-soft mode, and entering one of the fail-safe mode and the fail-soft mode based on the determination; and
if no error condition exists, or if no fail-safe mode applies, determining a second position of the physical member according to the second detected bit pattern.

10. A system, comprising:
a set of sensors providing inputs that each selectively provide a discrete signal, whereby the sensor inputs together provide a plurality of discrete signals;
a processor; and
a memory including instructions executable by the processor for:
receiving the discrete signals,
determining a bit pattern from the discrete signals,
detecting selectively an error condition, and identifying the error condition as one of at least one of a short to battery condition, a short to ground condition, and a failure of a make after break feature, according to the bit pattern,
and identifying a position of a physical member according to the bit pattern;
wherein the make after break feature fails if one of the inputs that was in a high asserted state fails to break to a low or non-asserted state when the physical member moves from a first detent position to a second detent position.

11. The system of claim 10, wherein the physical member is a shift lever, the system further comprising a vehicle that includes the shift lever.

12. The system of claim 10, the instructions further including instructions for transmitting an instruction based on the position of the physical member.

13. A computer-readable medium tangibly embodying instructions executable by a processor, the instructions comprising instructions for:
detecting a plurality of discrete signals, each of the discrete signals being received from a respective one of a plurality of inputs;
identifying a detected bit pattern based on the discrete signals;
detecting selectively an error condition, and identifying the error condition as one of at least one of a short to battery condition, a short to ground condition, and a failure of a make after break feature, according to the bit pattern; and
determining an expected position of a physical member according to the bit pattern;
wherein the make after break feature fails if one of the inputs that was in a high asserted state fails to break to a low or non-asserted state when the physical member moves from a first detent position to a second detent position.

14. The medium of claim 13, wherein the physical member is a shift lever for an automatic transmission in a vehicle.

15. The medium of claim 13, the instructions further comprising instructions for transmitting an instruction based on the position of the physical member.

16. The medium of claim 13, the instructions further comprising instructions for determining a plurality of possible bit patterns, each of the possible bit patterns being a bit pattern for a possible combination of the discrete signals, and identifying the detected bit pattern by matching it to one of the possible bit patterns.

17. The medium of claim 16, the instructions further comprising instructions for further comprising using a Karnaugh map for determining the plurality of possible bit patterns.

18. The medium of claim 17, the instructions further comprising instructions for associating states in the Karnaugh map having a majority of bits being ones with combinations of the discrete signals that have been deemed to be more important than other combinations of the discrete signals.

19. The medium of claim 18, wherein the combinations of the discrete signals that have been deemed to be more important are associated with detent positions of the physical member.

20. The medium of claim 13, wherein the bit pattern is a combination of high asserted states.

21. The medium of claim 13, the instructions further comprising instructions for:
detecting a second plurality of discrete signals, each of the second plurality of the discrete signals being received from a respective one of the inputs;
identifying a second detected bit pattern based on the second plurality of discrete signals;
determining whether an error condition exists according to the bit pattern;
if an error condition exists, considering whether the error condition warrants a fail-safe mode, considering whether the error condition warrants a fail-soft mode, and determining whether the error condition warrants one of the fail-safe mode and the fail-soft mode, and entering one of the fail-safe mode and the fail-soft mode based on the determination; and
if no error condition exists, or if no fail-safe mode applies, determining a second position of the physical member according to the second detected bit pattern.

22. The method of claim 1, further comprising identifying a specific one of the inputs as being responsible for the error condition.

23. The medium of claim 13, the instructions for comprising instructions for identifying a specific one of the inputs as being responsible for the error condition.

* * * * *